125,809

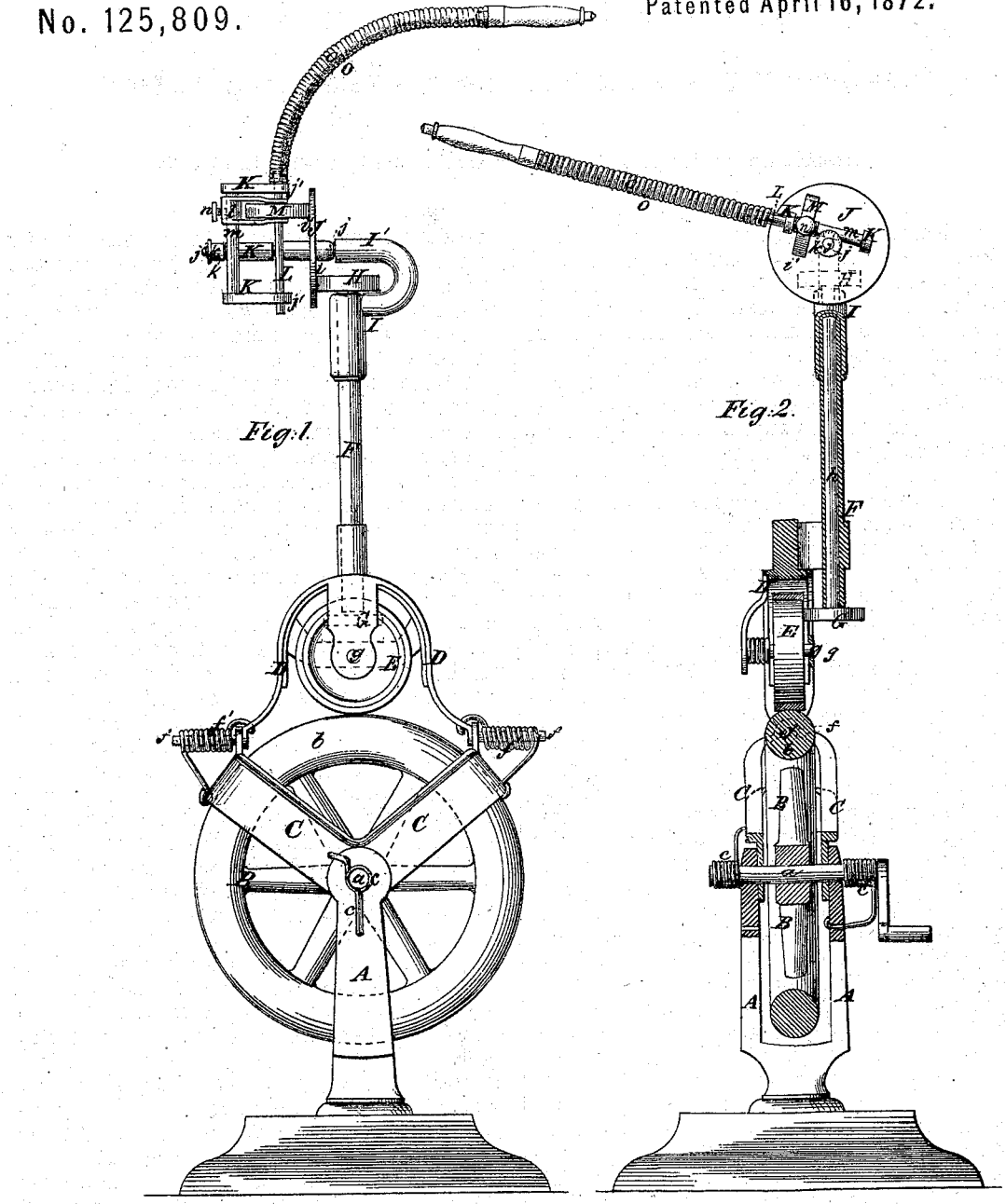

UNITED STATES PATENT OFFICE.

CHARLES P. GROUT, OF NEW YORK, N. Y.

IMPROVEMENT IN MACHINES FOR TRANSMITTING MOTION.

Specification forming part of Letters Patent No. 125,809, dated April 16, 1872.

*To all whom it may concern:*

Be it known that I, CHARLES P. GROUT, of the city, county, and State of New York, have invented a new and useful Improvement in Machines for Transmitting Motion in various directions, applicable to dentists' tools and other instruments, of which the following is a full, clear, and exact description, reference being had to the accompanying drawing forming part of this specification, in which—

Figure 1 represents a side elevation of my invention, and Fig. 2 a transverse section of the same taken at the line $x\ x$.

Similar letters of reference indicate corresponding parts in both figures.

This invention consists, first, in the novel construction and arrangement for transmitting power of a frictional wheel, so arranged, in contact with a driving-wheel having a rim of circular form in its transverse section, that it is capable of swinging over said rim either in a direction parallel with the planes of rotation of said driving-wheel, or transversely thereto, and still remain in contact with said rim, so that it may always have rotary motion transmitted to it, such swinging movement of the said frictional wheel permitting it to transmit motion by suitable gearing to a shaft which is capable of swinging in various directions relatively to the shaft of the driving-wheel. The invention also consists in certain novel arrangements of shafting, gearing, and connections, whereby rotary motion may be transmitted through shafts, while the angles at which such shafts are placed to each other may be varied at pleasure.

To enable others to fully understand my invention, I will proceed to describe the same with reference to the drawing.

A is an upright standard, formed or rigidly secured to a proper base. This standard is provided with or contains bearings for a horizontal shaft, $a$, on which the driving-wheel B is firmly secured. This driving-wheel has a rim, $b$, which is circular in its transverse section. C is a carrier, which is made V-shaped and to straddle the rim of the driving-wheel B, on both sides of which it is attached to the shaft $a$ in such manner as to be capable of swinging parallel with the planes of rotation of the latter; but the springs $c\ c$, coiled round the shaft $a$ and attached to the said carrier and to the standard A, tend to keep the said carrier in an upright position above the axis of the wheel B, as shown in Fig. 1, when not otherwise displaced from that position. D is an arched yoke, which is pivoted, by pivots $f$ $f$, formed on its ends, to the top of the saddle C, the axis of said pivots being in a line parallel with the planes of rotation of the driving-wheel B, and passing through the center of the circular transverse section of the rim $b$ of the said wheel. E is the friction-wheel, which runs on the circular rim $b$. This wheel is firmly secured to a short shaft, $g$, working in bearings provided in the yoke D, and its rim is covered with India rubber or other elastic material to make it hug the rim $b$ of the wheel B. This friction-wheel, being thus confined within the yoke D, is enabled to revolve on the rim of the wheel D in the plane of rotation of the latter, or transversely on the same, always remaining in contact with the latter, so that it may derive therefrom a rotary motion on its own axis. Springs $f'\ f'$ are applied to the pivots $f\ f$ of the yoke D in such a manner that the tension thereof will always tend to keep the yoke D parallel with the planes of rotation of the driving-wheel when not otherwise displaced. F is an upright tubular bearing, which is rigidly attached by an arm, $e$, to the yoke D, and serves to contain an upright shaft, $h$. To the lower end of this shaft $h$ a friction-wheel, G, is firmly attached, the rim of the said wheel, which comes in contact with the roughened surface of one side of the friction-wheel E, being covered with India rubber or elastic material to insure its receiving rotary motion from the said wheel E. At the upper end of this shaft $h$ another wheel, H, similar to the wheel G, is secured, and close under the said wheel H a swivel, I, is arranged to turn loosely on the tubular bearing F. On the upper portion of this swivel there is a curved arm, I', which reaches over the wheel H to carry a shaft, $j$, arranged at right angles with the shaft $h$, the said shaft $j$ being rigidly secured to the said arm I'. J is a friction-wheel or disk, which is fitted to turn freely on the shaft $j$, and so situated that its side surface $i$ comes in contact with the rim of the wheel H to receive motion therefrom. This wheel J is enabled, by the manner of its attachment to the swivel I, to turn all around the wheel H and still remain always in contact or frictional gear therewith. K is a frame arranged to swing loosely on that end of the shaft j which is furthest from the swivel I. This frame contains the bearings j' j' for a rotating shaft, L, which is situated at right angles with the shaft j. M is another wheel, similar to the wheels G and H, and firmly secured to that portion of the shaft L which is between the bearings j' j', such portion being on one side of the shaft h. The wheel M is adjusted in contact with the side surface i' of the friction-wheel J, by means of a nut, k, screwed onto a screw-thread on the end of the shaft. To enable the wheel M to obtain more or less speed, it can be moved toward the center of the friction-wheel J, or away from it by making the shaft L longitudinally adjustable, which is effected by a forked slide, l, working on the rod m of the frame K. The prongs of said slide, reaching to both sides of the wheel M, carry the latter and the shaft L with it. By means of a set-screw, n, the slide l can be secured in any desired position. In cases where a dentist's drill is operated the same is secured to a flexible extension, o, of the shaft L, as shown in the drawing. When other instruments are used for operation, the connection with the shaft L can be varied to suit.

The driving-wheel B, being set in motion by a hand-crank on the shaft b, or by a treadle, or by any other convenient means, produces the rotation of the friction-wheel E, from which motion is transmitted to the wheel G, rotating the shaft h and wheel H, which latter transmits motion to the friction-wheel J, being in contact therewith on one side, while the other side of the friction-wheel J is in contact with the wheel M, thus rotating the latter, which then turns the shaft L. The yoke D, swivel I, and swinging frame K permit the flexure of the connections between the several shafts, so that the point of the drill or tool may be directed to any point within its reach. When no force is applied to direct it to any other position, the socket F and its contained shaft are held upright by the springs f' f' and c c.

What I claim as new, and desire to secure by Letters Patent, is—

1. The combination of the wheel D, having the transverse section of its rim of circular form, the friction-wheel E, the carrier C, and yoke D, substantially as and for the purpose herein set forth.

2. The combination, with the said friction-wheel, yoke, and carrier, of the springs c c and f' f' for operation, substantially as herein set forth.

3. The combination, with the yoke D and friction-wheel E, of the socket F, shaft h, friction-wheels G H, swivel I, shaft j, and wheel J, arranged to operate substantially as herein specified.

4. The combination, with the shaft j and its wheel J, of the swinging frame K, shaft L, and friction-wheel M, arranged to operate substantially as herein described.

CHAS. P. GROUT.

Witnesses:
FRED. HAYNES,
R. E. RABEAU.